US005484047A

United States Patent [19]

Plenzler

[11] Patent Number: 5,484,047

[45] Date of Patent: Jan. 16, 1996

[54] CONTAINER DECORATING SYSTEM

[75] Inventor: John A. Plenzler, Sylvania, Ohio

[73] Assignee: Owens-Illinois Plastic Products Inc., Toledo, Ohio

[21] Appl. No.: 242,930

[22] Filed: May 16, 1994

[51] Int. Cl.$^6$ .................................................... B65G 47/46

[52] U.S. Cl. ................................ 198/370.01; 198/370.1; 198/375

[58] Field of Search .................................. 198/341, 362, 198/366, 369, 370, 371, 375, 376, 395, 468.2, 468.4, 357, 370.01, 370.1; 414/225, 226; 29/564, 564.1; 101/40, 42–45

[56] References Cited

U.S. PATENT DOCUMENTS

| | | | |
|---|---|---|---|
| 3,159,100 | 12/1964 | Marquiss | 198/468.2 |
| 3,223,225 | 12/1965 | Clark et al. | 198/357 |
| 3,722,662 | 3/1973 | Wakabayashi et al. | 198/468.2 |
| 4,081,078 | 3/1978 | Richardson et al. | 198/366 |
| 4,349,097 | 9/1982 | Curti | 198/369 |
| 4,509,638 | 4/1985 | Kato et al. | 198/468.4 |
| 4,530,430 | 7/1985 | Peterlini | 198/395 |
| 4,821,865 | 4/1989 | Hirata et al. | 198/369 |
| 5,207,156 | 5/1993 | Helling | 101/40 |

*Primary Examiner*—Joseph E. Valenza

[57] ABSTRACT

A method and apparatus for decorating containers by printing wherein the containers are moved successively past screen decorating stations or passes. The apparatus includes an entrance end and a discharge end. Reciprocating conveyors are associated with each pass and provision is made for engaging and lifting a container for printing at each pass. A discharge assembly is provided between each pass. Multiple infeed conveyors are provided at the entrance end of the apparatus and at the exit end.

8 Claims, 3 Drawing Sheets

CONTAINER DECORATING SYSTEM

This invention relates to apparatus for decorating containers by printing.

BACKGROUND AND SUMMARY OF THE INVENTION

In prior art apparatus for decorating containers by printing, containers are moved successively past screen decorating stations or passes. Where the container is not to be printed in all the stations, it is still necessary to move the container through all of the stations before it is discharged. This is time consuming especially when the number of containers to be printed is small.

Another problem with respect to such apparatus using a single conveyor to the entrance end causes delays in changing from one type of container to another type of container.

Typical apparatus for printing or decorating, as by silk screening, are shown in U.S. Pat. Nos. 4,005,649 and 4,398,627 wherein an intermittently operated conveyor is provided at each station which brings a container into position for printing and then transfers the container to a succeeding station for printing.

Accordingly, among the objectives of the present invention are to provide an apparatus wherein the containers can be discharged between passes; wherein plural inlet conveyors are provided; wherein the apparatus functions efficiently for short production runs; and wherein changes in the types of containers to be printed can be made quickly.

In accordance with the invention, a method and apparatus is provided for decorating containers by printing wherein the containers are moved successively past screen decorating stations or passes. The apparatus includes an entrance end and a discharge end and movable conveyors associated with each pass. Provision is made for engaging and lifting a container for printing at each pass. A discharge assembly is provided between each pass. Multiple infeed conveyors are provided at the entrance end of the apparatus and multiple discharge conveyors are provided at the exit end.

DESCRIPTION

Figure 1:
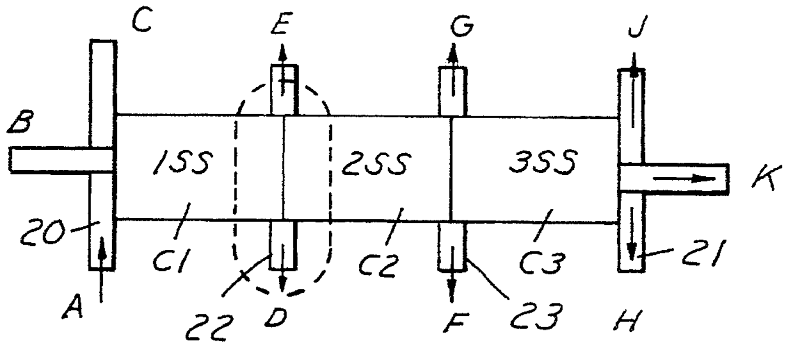
FIG. 1 is a diagrammatic plan view of a decorating system embodying the invention.
Figure 8:
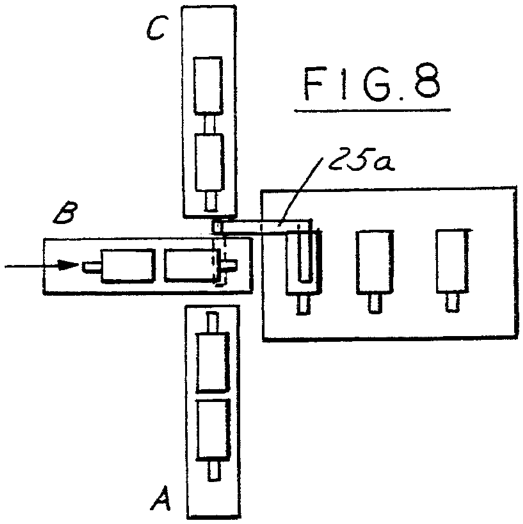
FIG. 8 is a view showing the parts in a further position, showing containers being supplied by conveyor B.
Figure 6:
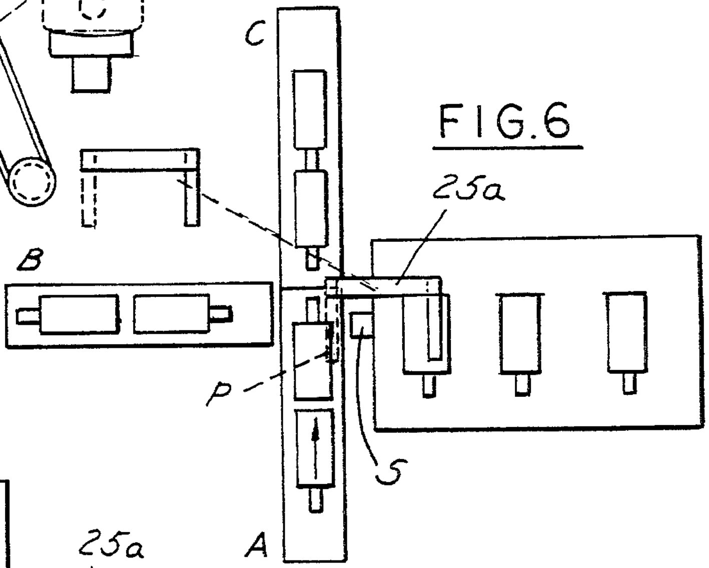
FIG. 6 is a diagrammatic plan view on an enlarged scale showing infeed conveyors arranged relative to one another as containers are being supplied by conveyor A.
Figure 7:
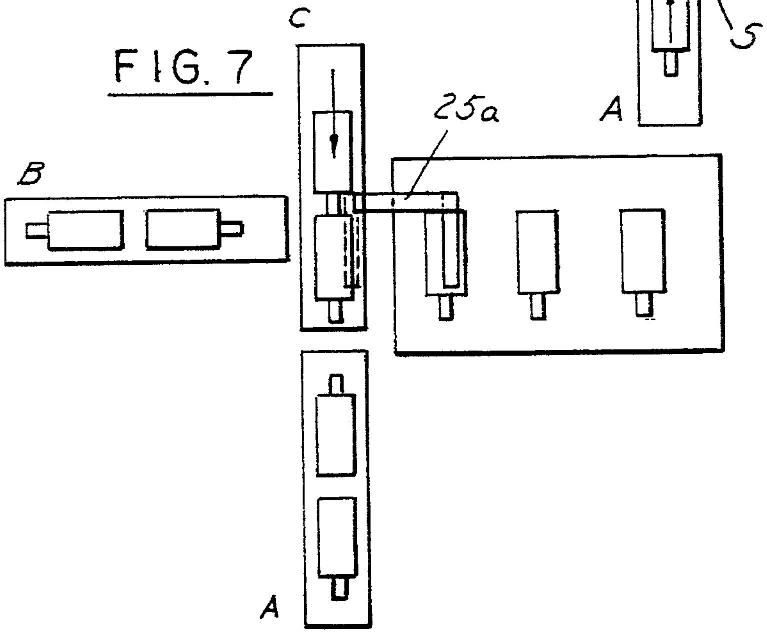
FIG. 7 is a view showing the parts in a different position, showing containers being supplied by conveyor C.

Referring to FIG. 1, in accordance with the decorating system embodying the invention, the apparatus includes conveyors 20 at there positions A, B, C that deliver containers to be decorated by printing through a plurality of stations, herein shown as three stations, 1SS, 2SS and 3SS. Conveyors 21 at three positions H, J, K remove the decorated containers from the apparatus. Further, in accordance with the invention, in such a system, an inlet conveyor 20 is located at positions A, B or C so that containers can be delivered selectively from positions A, B, C (FIGS. 6–8). Outlet conveyors can be located at positions H, J or K so that containers can be removed from the printer at any one of positions H, J, K. Further, in accordance with the system, if a container is to be provided with three decorations or colors, then it is printed at each of the three stations. If it is only to be provided with two decorations, it is decorated at two stations. If it is to be provided with only one decoration, pattern or color, then it is decorated in only one station. However, in each instance, the container must pass through three stations.

Figure 2:
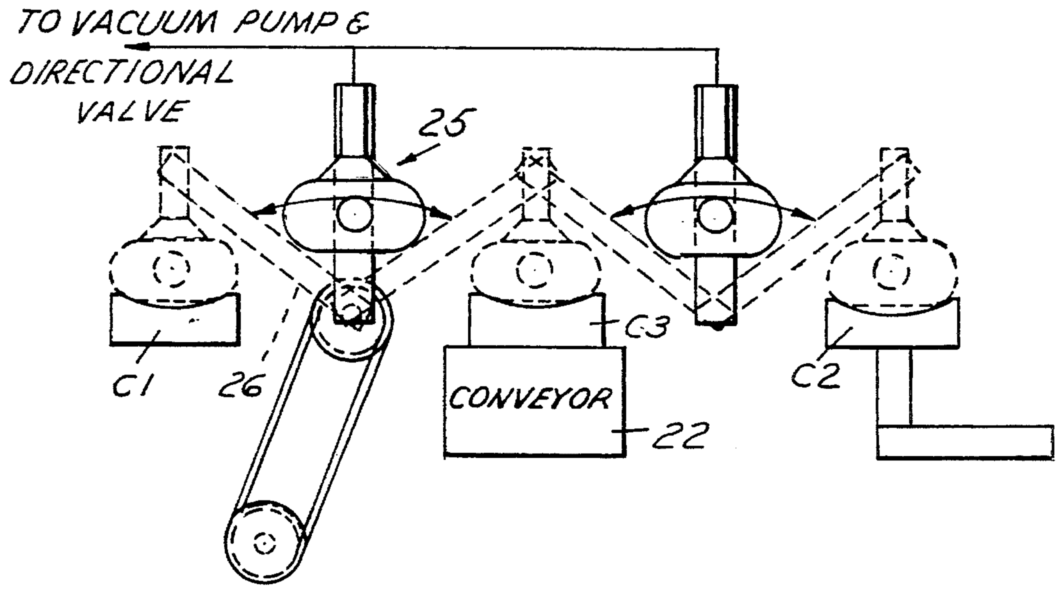
FIG. 2 is a partly diagrammatic elevational view showing a transfer between stations with the conveyor shown being inoperative.

In accordance with the invention, as shown in FIG. 1, additional reversible conveyors 22, 23 are provided between each station. A pick and place mechanism 25 is associated with each of the conveyors so that a container may be selectively delivered to the intermediate exit conveyors 22, 23 or to a succeeding station (FIG. 2). The conveyors 22, 23 are adapted to be moved to transversely of the apparatus in order to deliver a container to conveyor at one of positions F and G and one of positions H and J. When conveyor 22 or 23 is not being operated, a cradle is placed thereon for receiving a container from the prior decorating station for transfer to the next decorating station.

Figure 3:
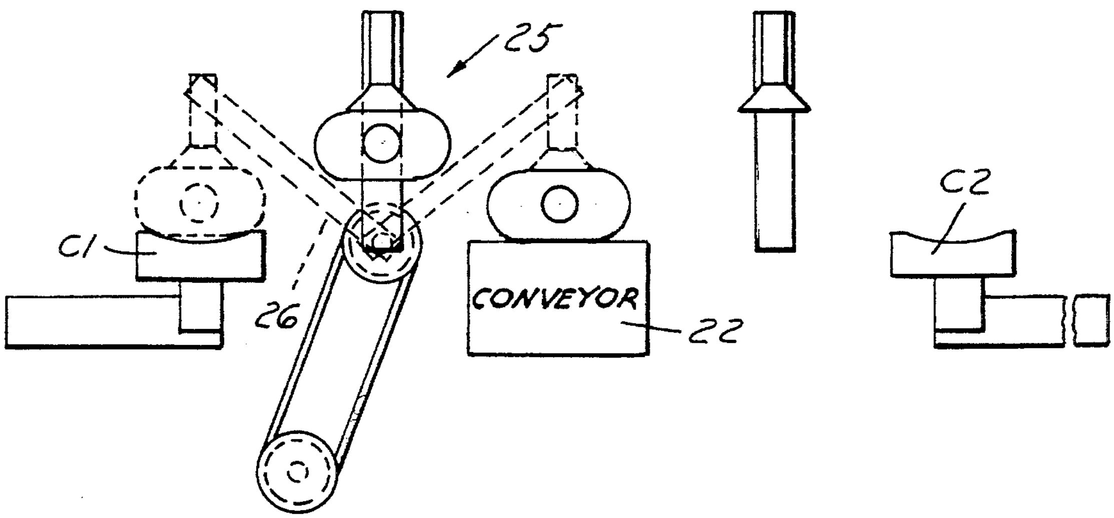
FIG. 3 is a view similar to FIG. 2 showing transfer of a container to a conveyor with the conveyor shown being operative to remove a container from the printer.

Referring to FIGS. 2 and 3, a pick and place mechanism 25 includes arm 26 and is provided for movement between a cradle C1 on the printing machine of first station 1SS and a cradle C2 of second station 2SS such that a container may be lifted and delivered from cradle C1 to cradle C2 (FIG. 2). Alternatively, pick and place mechanism 25 can be operated to deliver the container to a cradle C3 on an intermediate conveyor 22 (FIG. 3). A similar pick and place mechanism is provided between stations 2SS and 3SS so that a container can be selectively positioned on a cradle between stations 2SS and 3SS or delivered to conveyor 22.

Containers can be fed to each station from any direction, herein shown one of three conveyors A, B, C, but not at the same time. The containers can be oval or cylindrical in cross section shape. Thus, FIG. 1 shows a conveyor feeding bottles at position A or alternative position B or position C. Similarly, one of the three conveyors H, J and K can be actuated to remove containers from station 3SS.

A sensor S senses if the bottle neck is leading and, if it is, the printer controls will signal the pick and place mechanism 25*a* to turn the bottle end to end to orient the bottle properly onto the cradle of the printer. The pick and place mechanism 25 is part of the screen printer and is described further below.

Figure 4:
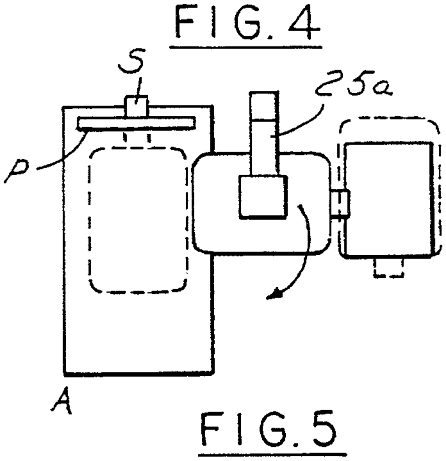
FIG. 4 is a plan view showing a container being rotated to place the neck of the container into proper orientation for printing.
Figure 5:
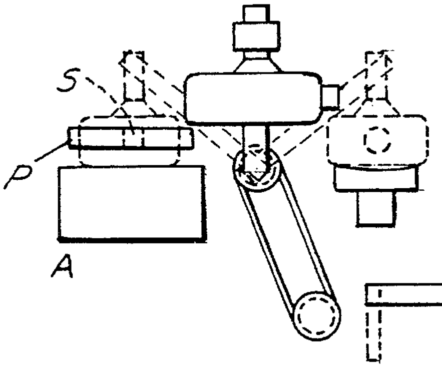
FIG. 5 is a front view of FIG. 4.

A container is conveyed on a conveyor until it comes to rest against a stop plate. The sensor S and associated stop plate P detects the presence or absence of the bottle neck (FIGS. 4–6). If it detects the neck, a pick and place mechanism 25a is activated to turn the bottle end to end as it transfers the container from the conveyor to a vacuum cradle. There are many types of mechanisms that can be used to rotate the bottle. The one shown is a simple rotary actuator that turns the container either 90° or 180°. When feeding a container on conveyor A, a sensor S detects the base of the container, the rotary actuator does not turn and the pick and place mechanism 25a transfers the container to the tray. The pick and place mechanisms 25, 25a use a vacuum cup to hold the container. The vacuum to the cup is turned on and off by the screen printer controls to enable the cup to grasp and release the container as needed. Vacuum is also used to hold the container in the tray as the container is transported through the printer. A pick and place mechanism 25 is used in a similar manner to discharge the container onto one of the conveyors H, J, K at the end of the printer.

Figure 9:
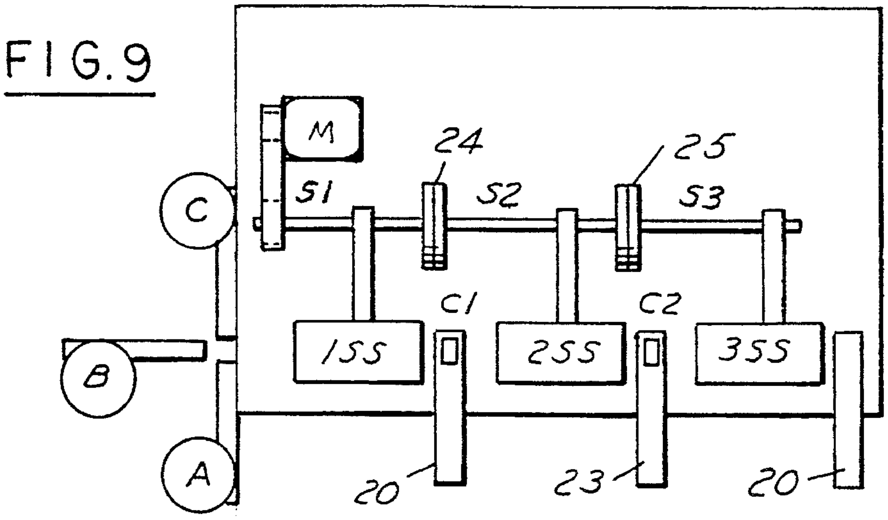
FIG. 9 is a schematic drawing of the decorating system operating in three passes of decorating.
Figure 10:
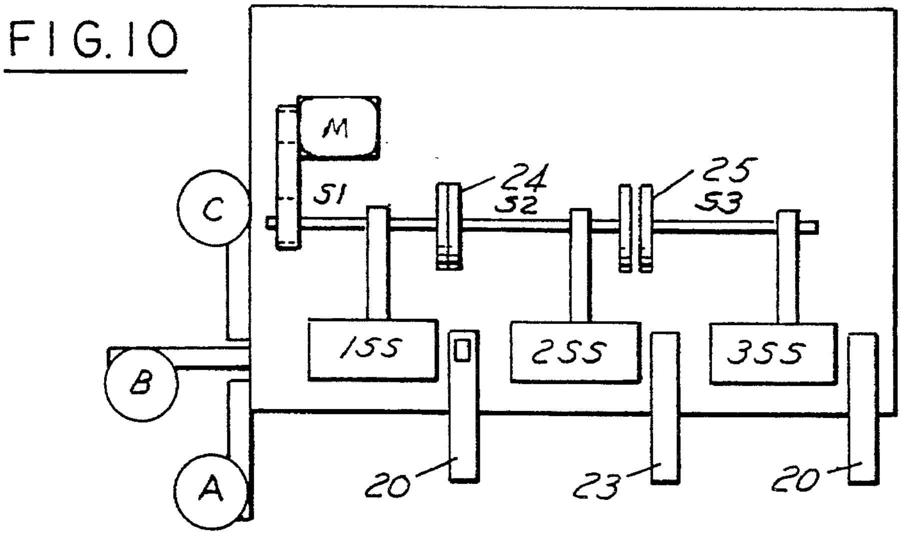
FIG. 10 is a schematic drawing of the decorating system operating in two passes of decorating.
Figure 11:
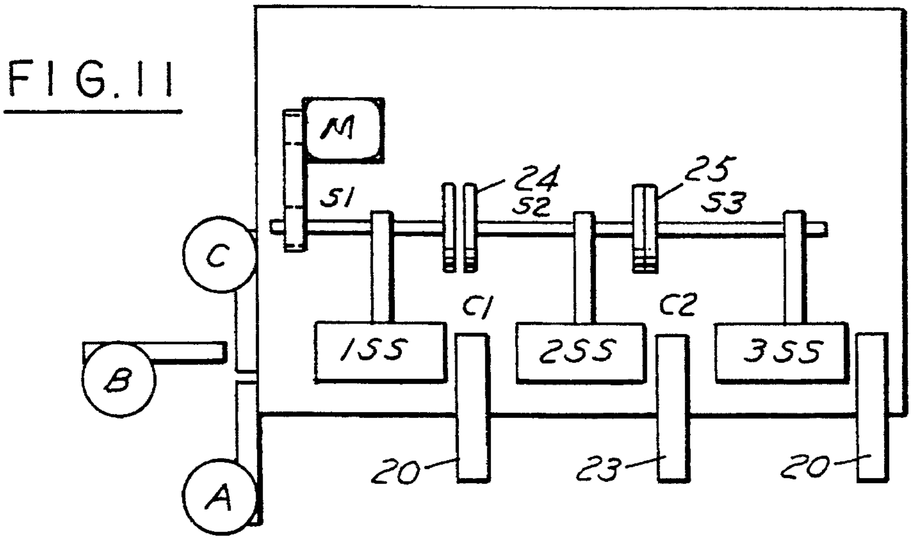
FIG. 11 is a schematic drawing of the decorating system operating in one pass of decorating.

Referring to FIGS. 9–11, the apparatus is provided with a drive M for driving each of the three decorating stations through shafts S1, S2, S3 interconnected by single position clutches 24, 25.

When a container is to be decorated in three passes (patterns or colors), both clutches are engaged (FIG. 9). For two passes, clutch 25 is disengaged (FIG. 10). For a single pass, both clutches are disengaged (FIG. 11).

In prior apparatus currently being used, all containers are discharged from the end of the machine. If a three pass printer is used to do two pass printing, three passes or tooling are required and the printer must be set up for all three passes. This costs more for tooling and set-up time. By discharging the container after two passes, third pass tooling is not needed. This holds true for any number of printing passes that a printer can be set up for. The ability to feed from three directions and discharge bottles where needed results in a screen printer that can be used for fast job changes and any reasonable number of passes up to eight stations.

An important feature is the ability to discharge containers between passes. Three infeed conveyors provide the possibility of quickly changing from one container to another. Such a printer with multiple feed conveyors and discharge conveyors is preferred for a short run, fast job change screen printer.

Thus a fast job change may require a job change every eight hours. During a twenty-four hour period, in accordance with the invention, three different bottles can thus be set up and printed. Each infeed conveyor can be set up for one of the three bottles. If the containers require different number of passes, for example one type, one pass; a second type, two passes, or a third type, three passes, then the third pass can always be set-up for one container. The second pass would only be changed between the other two types of containers B and C. The first pass would be changed from the first type to the second or third type.

This requires less job change time than if all three passes were set up for each container C. Also only one pass of tooling is required for the first type, and two passes of tooling for the second type. In addition, the infeed equipment can be set up for a completely different container while one of the other feeders is being used. This increases the capability of the system.

In addition, the printer can be fed on any one of three conveyors, A, B or C. Containers can be discharged at any of the positions between passes or at the end of the final pass.

If requirements are to run a 1SS, 2SS and a 3SS job in a 24 hour period, the third pass would always be set-up. It is possible to have separate pack locations for the three jobs and separate loading locations. This means no conveyor adjustments for loading and discharging of bottles. The unneeded conveyor can be moved out of the way and as quickly replace it as needed. This permits each container feeder to be set-up and not require changing between print runs. This permits only the tooling to be purchased as needed. In the prior art, the practice has been to build a three station apparatus tooling even if the job required 1SS or 2SS.

It can thus be seen that there has been provided a method and apparatus for decorating containers by printing wherein the containers are moved successively past screen decorating stations or passes. The apparatus includes an entrance end and a discharge end and movable conveyors associated with each pass. Provision is made for engaging and lifting a container for printing at each pass. A discharge assembly is provided between each pass. Multiple infeed conveyors are provided at the entrance end of the apparatus and multiple discharge conveyors are provided at the exit end.

What is claimed is:

1. In an apparatus for decorating containers wherein containers are successively moved through a plurality of successive decorating stations which includes an inlet conveyor at the first of the stations and a discharge conveyor at the last station, the method which comprises providing at least one outlet conveyor between adjacent decorating stations, and providing oscillating grippers capable of moving a container between stations and at least temporarily depositing a container on an outlet conveyor.

2. The method set forth in claim 1 including the step of selectively deactivating succeeding decorating stations when the containers are selectively moved to an outlet conveyor between stations.

3. The method set forth in claim 2 including providing a plurality of selectively operated inlet conveyors at said first station.

4. The method set forth in claim 3 including a plurality of selectively operated discharge conveyors for receiving containers at said last station.

5. The method set forth in any one of claims 1–4 including the step selectively actuating said inlet and outlet conveyors.

6. In an apparatus for decorating containers wherein containers are successively moved through a plurality of decorating stations which includes an inlet conveyor at the first of the stations and a discharge conveyor at the last station, the improvement comprising an outlet conveyor between adjacent decorating stations, and oscillating grippers capable of moving a container between stations and at least temporarily depositing a container on an outlet conveyor.

7. The apparatus set forth in claim 6 including means selectively deactivating succeeding decorating stations when the the containers are selectively moved to an outlet conveyor between stations.

8. The apparatus set forth in any one of claims 6 and 7 including means for sensing the orientation of a container and orienting the container for movement through said station.

* * * * *